May 24, 1949.  T. M. LINVILLE  2,471,157
DYNAMOELECTRIC MACHINE
Filed July 10, 1947
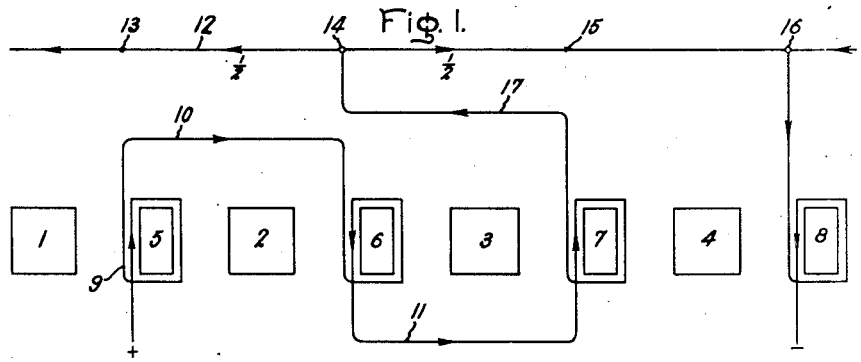
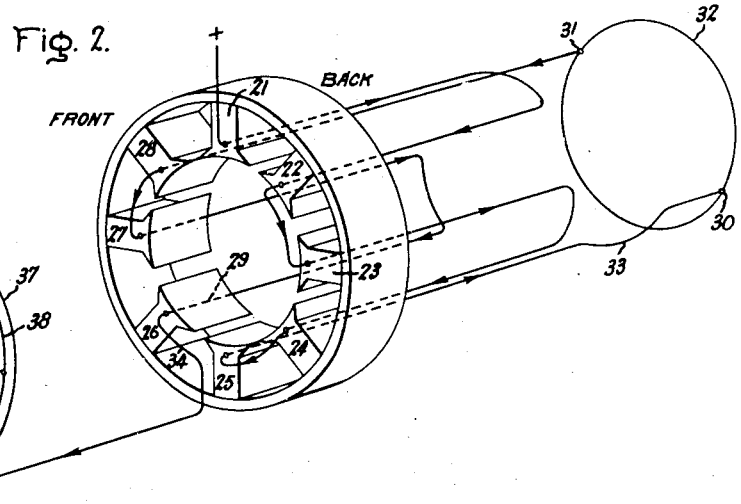
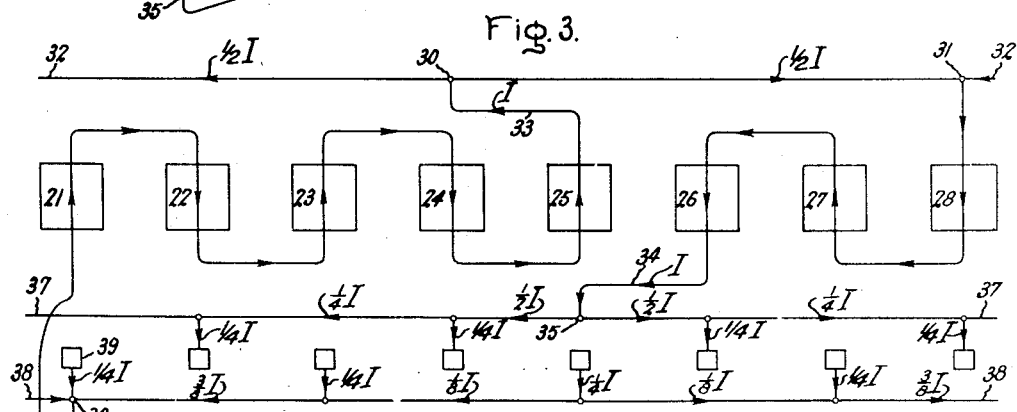
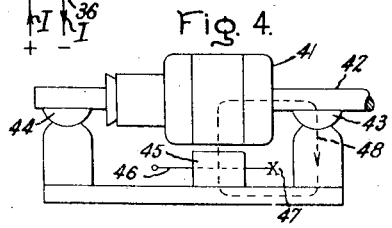
Inventor:
Thomas M. Linville,
by Prowell S. Mack
His Attorney.

Patented May 24, 1949

2,471,157

UNITED STATES PATENT OFFICE 2,471,157

DYNAMOELECTRIC MACHINE

Thomas M. Linville, Schenectady, N. Y., assignor to General Electric Company, a corporation of New York Application July 10, 1947, Serial No. 760,152

9 Claims. (Cl. 171—252)

My invention relates to improvements in dynamoelectric machines and, more specifically, to improvements in end connections for windings within such machines.

Heretofore an annoying problem to the designer of rotating electric machines, especially machines of the direct current type having an odd number of half turns or pole face conductors per pole, or having turns on a commutating pole equal to a whole number plus one-half, has been the difficulty of arranging, at each end of the machine, the end connections of the windings to eliminate loops or part loops producing ampere turns around the shaft and unbalancing the flux in the various poles. It does not always conveniently lay within the province of the designer to change the number of half turns (or conductors) required for a certain purpose. An example occurs when, in such a machine, it is desired for design reasons to have turns on a commutating pole equal to a whole number plus one-half, or to use an odd number (such as five) pole face rods per pole, the end connections of which conventionally cause undesirable magnetomotive forces which not only tend to cause shaft currents and bearing failures, but unbalance the flux in the various poles adversely affecting commutation and causing increased losses and heating in the machine as a whole and causing stray magnetic fields which in marine applications interfere with the degaussing of ships.

An object of my invention is to provide simple and inexpensive means for overcoming these difficulties.

Another object of my invention is to provide an improved arrangement of end connections for a dynamoelectric machine of the direct current commutator type so that there will be no damaging shaft or other wasteful currents or flux caused by magnetic unbalance due to end connections.

Broadly, the means employed in the embodiments herein illustrated and described comprises one or more balancing rings used at one or both ends of a multipolar dynamoelectric machine with connections from certain polar conductors to diametrically opposite points on each balancing ring so used. Where necessary said connections loop circumferentially forward or back to reach said points.

Further objects and other aspects of the invention will be better understood from consideration of the following description taken in connection with the accompanying drawing, in which Fig. 1 represents a diagrammatic development indicating my invention applied to an assumed one and one-half turn per pole interpole winding of a four pole direct current motor, Fig. 2 represents a diagrammatical representation of my invention applied to an eight pole direct current motor of the commutator type assumed to have one pole face conductor or "rod" per pole, Fig. 3 is a diagrammatical development of the winding connections shown in Fig. 2, and Fig. 4 is a diagrammatical representation showing the path taken by the flux created by a conventional unbalanced end connection in a dynamoelectric machine of the direct current type having an odd number of pole face or pole side conductors and not provided with my invention.

I have shown in Fig. 1 a diagrammatic development of a direct current motor having a stator portion with conventional field poles 1, 2, 3 and 4 and interpoles 5, 6, 7 and 8. Each of said interpoles is provided with a one and one-half turn winding 9. Either the main poles or the interpoles, or both, may be provided with other windings (not shown), but it is assumed that these other windings are either of a large number of small turns of wire, so that the end connections thereof have little effect on the condition sought to be corrected, or of an integral (rather than fractional) number of turns per pole so that the end connections are naturally arranged to balance out. When a winding has an integral number of turns per pole the end connections from pole to pole are at one end of the machine only, whereas when the turns per pole are fractional, pole to pole connections must be used at both ends of the machine. The front, or commutator end, connection 11 is shown at the bottom of the figure and the back end connections are shown at the top of the figure.

The interpole windings are interconnected by conventional end connections such as 10 and 11, and are also connected at the back end of the machine to a balancing ring 12 at the points 14 and 16. Since Fig. 1 is a diagrammatic development on a plane surface of a circular winding arrangement, it is obvious that the back balancing ring 12 forms a complete circle. Points 14 and 16 are diametrically opposite on said circle. Balancing ring 12 is of uniform cross-section and of uniform conductivity throughout, so that current entering the ring at 14 and leaving at 16 will divide equally in the two halves of the ring.

In Fig. 2 I have shown my invention applied to an 8 pole machine having stator field poles 21, 22, 23, 24, 25, 26, 27 and 28 each assumed for illustrative purposes provided with a single pole face conductor 29. Conductors 29 in pole pieces 21, 23 and 26 have conventional back end connections connecting them with conductors 29 in adjacent pole pieces 22, 24 and 27 respectively. The conductors 29 in pole pieces 25 and 28 are back connected to diametrically opposite points 30 and 31 on the annular back balancing ring 32 which is of uniform conductivity throughout. It should be noted that, in order to reach these opposite points, it is necessary to loop back one of the conductors through 1/8 of a circle, as shown at 33, but this back loop serves only to aid in balancing out the back connection ampere turns as fully explained in connection with consideration of Fig. 3.

Returning to consideration of Fig. 2, it is seen that the front, or commutator end, connections are made directly between adjacent pole pieces 22 and 23, 24 and 25, and between 27 and 28. From pole piece 26 a front end connection is looped around through 1/8 of a circle as shown at 34 in order to complete the balancing when connection is made to one of the two brush rings 37 and 38 each of which is attached to alternate brushes to interconnect with half of the eight commutator brushes 39. The main power connections are made to the two brush rings of uniform conductivity at the diametrically opposite points 35 and 36.

Fig. 3 is a diagrammatic development on a plane surface of the winding arrangement shown in Fig. 2. The same parts are like numbered in Figs. 2 and 3.

Loops 33 (at the back of the machine) and 34 (at the front) are used to loop around and not only reach a diametrically opposite point on the balancing ring (or rings) but at the same time provide additional ampere turns so that the total algebraic sum of the ampere turns produced by end connections at any one end of the machine will be zero. Loop 17 in the four pole embodiment shown in Fig. 1, serves the same function. It will be found desirable to provide such loops whenever it is necessary to balance end connections of windings associated with an even number of pairs of poles.

In Fig. 4 I have shown a conventional arrangement (not provided with my improved invention) in which a dynamoelectric machine has a rotor 41 with a shaft 42 extending therethrough and supported by bearings 43 and 44. The machine has a conventional stator portion including field pole pieces of which only the single pole piece 45 is shown. Pole piece 45 is provided, for illustration, with a single pole face conductor 46 having a back end connection in which it is assumed that current flows away from the observer as indicated by the "X" at 47. This unbalanced back end connection current sets up a magnetic field which, as indicated by dotted line 48, travels along the shaft, down through the bearing, around the base of the machine, through the pole piece, across the air gap and back through the rotor to the shaft. This flux causes so called shaft currents which result in eddy currents in the shaft, pitting of the bearing, an unbalance of flux in pole 45 with respect to flux in the other poles, stray magnetic fields and other undesirable effects which, as stated before, it is an object of my invention to eliminate.

Returning to Fig. 1, for consideration of the operation of my invention, the symbol "I" may be used to represent the value of current in each of the single interpole half turns (of which there are three per pole). Then, it is seen, the current is 1/2 "I" in each half of balancing ring 12. The total (i. e., net) ampere turns (and, hence, the net magnetomotive forces) produced by the back end connections may be expressed by giving rightward current flow a plus sign and leftward current flow a negative sign and summing up the effect in each of the areas delineated by the points 13, 14, 15 and 16 on the balancing ring as follows:

13 to 14 = −1/2 + 1 = +1/2
14 to 15 = +1/2 − 1 = −1/2
15 to 16 = +1/2      = +1/2
16 to 13 = −1/2      = −1/2

Net 0

It will be noticed that the net current flowing past the end of each main pole is uniformly 1/2 "I." Therefore, the magnetomotive force acting on each main pole is uniformly equal to that acting on every other main pole which is an objective of my invention. This applies also to the commutating poles where the current flowing along the top end of each pole will be seen to be 2 1/2 "I."

Similarly the connections at the front end of the machine may be made to balance by using a like balancing ring (not shown), or by connection to brush rings such as were fully described in connection with Figs. 2 and 3. Generally a like balancing ring will be used at the front end of the machine to balance the end connections of the windings, independently of the brush rings, in order that the current flowing along the end of each pole, close to the pole, will be uniform and equal to that at the back end. The brush rings are generally some distance from the poles and are balanced separately. Fig. 3 is used, however, for illustrative purposes to show the more complicated arrangement when it is desired to use brush rings for balancing front end connections.

In Fig. 3 the back end connections balance out in the same manner as do the back end connections in Fig. 1. It may be proved that the front end connections in Figs. 2 and 3 also balance out by letting the symbol "I" represent the value of current in a single pole face conductor and again assigning plus values when the current flow is thought of as being rightward from plus to minus. It may be assumed that current going to brush ring 37 will divide equally along the four brushes connected thereto, 1/4 to each brush, and current from the remaining four brushes to the negative of the machine will come 1/4 from each brush. The brush supplying 1/4 of the current from a point midway around the equalizing ring 38 with respect to the output connection 36 will have its current divide equally in the two halves of the ring (i. e., 1/8 of the total current in each direction, as indicated on the drawing). Then the net ampere turns or magnetomotive forces for the front end connections, shown in Figs. 2 or 3, may be arrived at as follows:

Poles 21 to 22 = −3/8            = −3/8
Poles 22 to 23 = +1 − 1/4 − 3/8  = +3/8
Poles 23 to 24 = −1/4 − 1/8      = −3/8
Poles 24 to 25 = +1 − 1/2 − 1/8  = +3/8
Poles 25 to 26 = −1 + 1/2 + 1/8  = −3/8
Poles 26 to 27 = +1/4 + 1/8      = +3/8
Poles 27 to 28 = −1 + 1/4 + 3/8  = −3/8
Poles 28 to 21 = +3/8            = +3/8

Net ---------------------------- 0

There is thus provided a device of the character described capable of meeting the objects hereinabove set forth.

By employing equalizer rings and connections to diametrically opposite points thereon substantially as described, end connections may always be balanced. This accomplishes the twofold result previously mentioned in that (1) there are no net magnetomotive forces in the shaft axis and consequently shaft and bearing currents are avoided and (2) the magnetomotive forces on each pole are equalized.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In a dynamoelectric machine of the direct current type having a plurality of poles with an odd number of polar conductors per pole, means including at least one balancing ring of uniform cross-section with connections from two of said polar conductors to diametrically opposite points on said ring to balance magnetomotive forces produced by end connections between the remainder of said polar conductors.

2. In a dynamoelectric machine of the direct current type provided with a plurality of poles having an odd number of conductors per pole, back end connections between certain of said conductors, and means including a balancing ring of substantially uniform cross-section with connections to diametrically opposite points on said balancing ring from the remainder of said conductors for producing substantially no net component of magnetomotive force along the shaft axis of the machine due to back end connections between said conductors.

3. In a dynamoelectric machine of the direct current type provided with a plurality of poles having an odd number of conductors per pole, back end connections between certain of said conductors, and means including a balancing ring of substantially uniform cross-section with connections to diametrically opposite points on said balancing ring from certain of said conductors for producing substantially no net component of magnetomotive force along the shaft axis of the machine due to back end connections between said conductors and for producing no component of magnetomotive force along any polar axis relatively different from that along the axes of all similar poles.

4. In a dynamoelectric machine of the direct current type provided with a plurality of main poles and a plurality of interpoles, interpole windings of an odd number of half turns per pole, a back end balancing ring, and back end connections between said interpole windings, said connections including connections to two diametrically opposite points on said balancing ring.

5. In a dynamoelectric machine of the direct current type provided with a plurality of main poles and a plurality of interpoles, interpole windings of an odd number of half turns per pole a back end balancing ring, back end connections between said interpole windings said connections including connections to two diametrically opposite points on said back end balancing ring, a front end balancing ring, front end connections between said interpole windings, said connections including connections to two diametrically opposite points on said front end balancing ring.

6. In a dynamoelectric machine of the direct current type provided with a plurality of field poles, an odd number of pole face conductors per pole, back end connections for said conductors, and means including a back end balancing ring and connections to diametrically opposite points on said balancing ring for producing no net component of magnetomotive force in the shaft axis from current in said back end connections.

7. In a dynamoelectric machine of the direct current commutator type having an even number of pairs of poles with an odd number of conductors per pole, means to eliminate part loops producing magnetic flux along the shaft, said means including a back end balancing ring and diametrically opposite connections to said balancing ring from certain of said conductors and said means including brush rings for balancing out the ampere turns of end connections at the front end of said machine.

8. In a dynamoelectric machine of the direct current type, a plurality of main poles, a plurality of commutating poles each provided with an odd number of half turns of commutator pole windings, end connections between certain of said windings, and means including at least one balancing ring with connections from other of said windings to diametrically opposite points on said balancing ring for balancing out ampere turns produced by said end connections between said commutator windings.

9. In a dynamoelectric machine of the direct current commutator type having an even number of pairs of poles, each of said poles provided with an odd number of pole face conductors, end connections directly between certain of said conductors, a balancing ring, connections between the remainder of said conductors to diametrically opposite points on said balancing ring, one of said connections being looped back circumferentially one pole span to reach one of said diametrically opposite points and to produce no unbalanced magnetomotive forces due to end connections.

THOMAS M. LINVILLE.

REFERENCES CITED

The following references are of record in the file of this patent:

UNITED STATES PATENTS

| Number | Name | Date |
|---|---|---|
| 877,017 | Torda | Jan. 21, 1908 |
| 2,319,614 | Linville | May 18, 1943 |